United States Patent [19]
Ren et al.

[11] Patent Number: 5,126,747
[45] Date of Patent: Jun. 30, 1992

[54] METHOD AND APPARATUS FOR DISPLAYING RADAR DATA

[75] Inventors: Victor Ren, Fremont; Jim Nocar, Pleasonton, both of Calif.

[73] Assignee: Ramtek Corporation, San Jose, Calif.

[21] Appl. No.: 429,831

[22] Filed: Oct. 31, 1989

[51] Int. Cl.$^5$ ............................................. G01S 7/298
[52] U.S. Cl. .................................. 342/185; 342/181; 358/140
[58] Field of Search ............... 342/181, 185; 358/140; 364/521 (U.S. only)

[56] References Cited

U.S. PATENT DOCUMENTS

| | | | |
|---|---|---|---|
| 4,128,838 | 12/1978 | Brands et al. | 342/185 |
| 4,471,449 | 9/1984 | Leavitt et al. | 358/140 X |
| 4,568,941 | 2/1986 | Thomas et al. | 342/185 |
| 4,697,185 | 9/1987 | Thomas | 342/185 |
| 4,845,501 | 7/1989 | Pease et al. | 342/185 |

*Primary Examiner*—Gilberto Barrón, Jr.
*Attorney, Agent, or Firm*—Limbach & Limbach

[57] ABSTRACT

A method and apparatus for displaying radar data on a display monitor, wherein the monitor is divided into octants, and wherein the radar data defines a pie-shaped slice to be displayed within an octant on the monitor. The radar data has a center point which is defined as a point on an x-y plane, a radius r which is a defined as a number of displacement units in length extending radially from the center point, a starting angle $\theta$, a delta angle $\partial\theta$, radial displacement data which defines the color of groups of displacement units along the radius r for the slice, and a quantity Q which is the number of groups of radial displacement data within said radar data. The radar data is received by a data processing system and stored in memory. The video display monitor is updated by a screen refresh memory controlled by a graphics accelerator. The graphics accelerator receive the radar data for the slice to be displayed from the data processing system; determines the octant in which the slice is to be displayed; expands the radial displacement data into a color table which correlates the radial displacement data to pixel colors so that each displacement unit along the radius r has a color assigned to it; generates vertical or horizontal fill vectors for filling in the slice as determined by the octant in which the slice is to be displayed, said vectors having pixel colors as determined by the color table; and inhibits the loading step while the expanding or generating steps are being performed.

16 Claims, 7 Drawing Sheets

| ADDRESS | CONTENTS |
|---|---|
| 1 | RED |
| 2 | RED |
| 3 | RED |
| 4 | RED |
| 5 | RED |
| 6 | GREEN |
| 7 | GREEN |
| 8 | GREEN |
| 15 | GREEN |
| 16 | RED |
| 17 | RED |
| 255 | BLUE |
| 256 | BLUE |

METHOD AND APPARATUS FOR DISPLAYING RADAR DATA

BACKGROUND

1. Field of the Invention

This invention relates to the display of radar data, and more particularly, to a method and apparatus for converting radar data to Cartesian coordinates and drawing the data in an accelerated fashion.

2. Discussion of the Prior Art

Radar data is typically displayed on a cathode ray tube employing a raster scan technique in which pixels defining the entire surface of the CRT are referenced by a Cartesian coordinate system. However, radar data is typically in polar coordinate form, such that a conversion from polar to Cartesian coordinates must take place in order to display the data. Algorithms for achieving this conversion are well known in the art, but take 2 seconds or more to update the raster over 360 degrees of data. A typical algorithm receives data and decodes it, filling a slice along a radial line while decoding.

SUMMARY OF THE INVENTION

It is an object of the present invention to provide a more efficient way to display radar data on a video display monitor.

The present invention provides a method and apparatus for displaying radar data on a video display monitor, wherein the display is divided into octants, and wherein the radar data defines a pie-shaped slice to be displayed within an octant on the monitor. The radar data has a center point which is defined as a point on an x-y plane, a radius r which is a defined as a number of displacement units in length extending radially from the center point, a starting angle $\theta$, a delta angle $\partial\theta$, radial displacement data which defines the color of groups of displacement units along the radius r for the slice, and a quantity Q which is the number of groups of radial displacement data within said radar data. The radar data is received by a data processing system and stored in memory. The video display monitor is updated by a screen refresh memory controlled by a graphics accelerator. The present invention provides for:

(a) determining the octant in which the slice is to be displayed and calculating a set of constants;

(b) loading the radial displacement data into a graphics accelerator;

(c) expanding the radial displacement data into a color table which correlates the radial displacement data to pixel colors so that each displacement unit along the radius r has a color assigned to it;

(d) loading the center point data into the graphics accelerator;

(e) generating vertical or horizontal fill vectors for filling in the slice as determined by the octant in which the slice is to be displayed, said vectors having pixel colors as determined by the color table; and (e) inhibiting the loading steps while the expanding or generating steps are being performed.

These and other objectives, features and advantages of the present invention will be more readily understood upon consideration of the following detailed description of the present invention, taken in conjunction with the accompanying drawings.

DETAILED DESCRIPTION OF THE INVENTION

Figure 1:
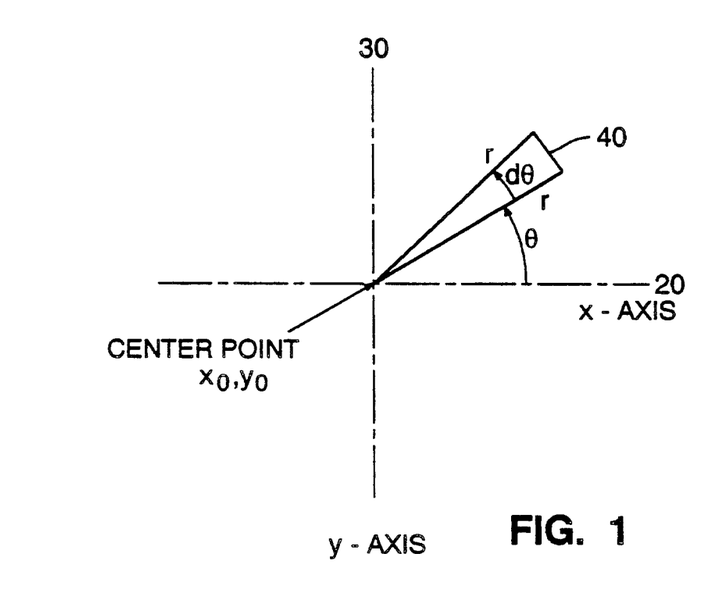
FIG. 1 is an illustration of a slice on a radar display screen.

A cathode ray display (CRT) 10 for displaying radar data is illustrated in FIG. 1. The actual drawing of the data on the CRT is performed by a raster scan (not shown) which illuminates pixels (not shown) which define the visual appearance of the entire screen surface of the CRT 10. Each pixel is referenced as a point x,y on a Cartesian coordinate system such as that defined by the x-axis 20 and the y-axis 30. The displayed radar data is updated by a slice 40 of new data. The slice has a pie shape which is defined in polar coordinate terms as having a radius r, and a delta angle $\partial\theta$. The slice 40 is referenced in the x-y plane as emanating from a center point $x_0, y_0$ at an angle $\theta$ from the x axis 20. Each slice represents a $\partial\theta$ ranging from approximately 0.1° to 2°. A full screen update, i.e., a display of 360° of new slice data, takes less than one second under the method of the present invention.

Figure 2:
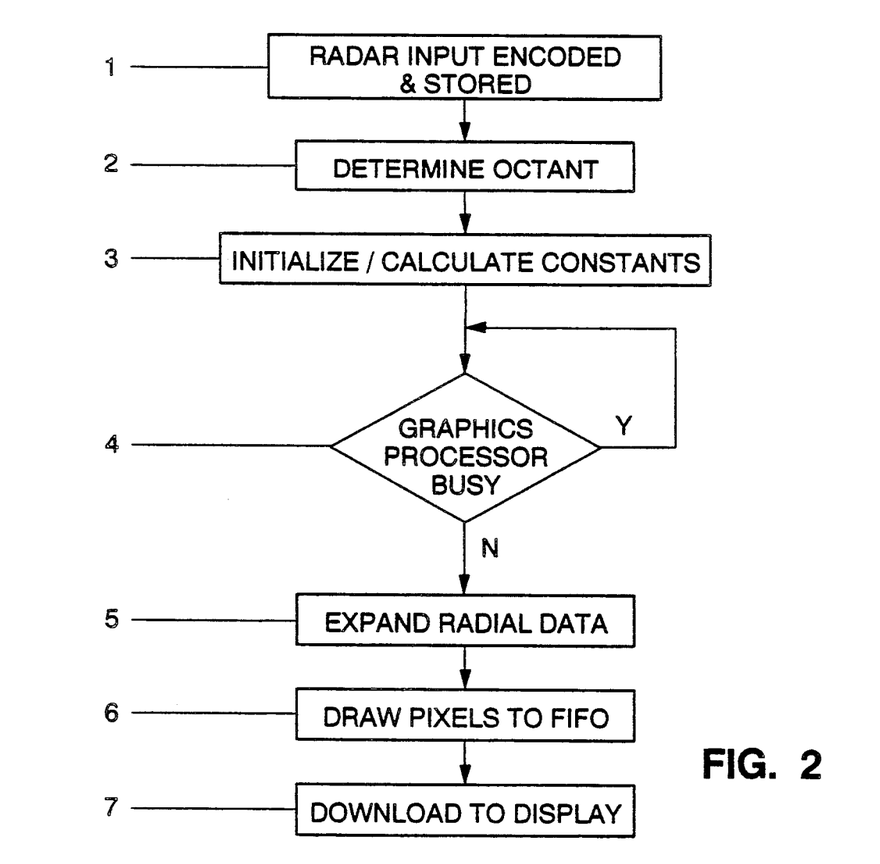
FIG. 2 is a flow chart illustrating the present invention.

A basic flow chart illustrating the present invention is given in FIG. 2. In step 1, radar data is received by a data processing system (CPU), such as a Texas Instruments 34010 graphics processor, encoded and stored in CPU memory. In step 2, the CPU identifies the octant in which the slice of radar data is to be drawn. In step 3, a set of constants is calculated. In step 4, the CPU waits for a not busy signal to be set in a graphics accelerator status register, then reads from CPU memory into a graphics accelerator color register a portion of the radar data providing a number of radial displacement units which have the same color. In step 5, the data in the color register is expanded into a table which stores a color value for each radial displacement unit in successive registers. In step 6, a series of vectors is drawn to fill the slice using a procedure to correlate a color value from the color table with x,y coordinates corresponding to pixel locations, the result being stored in a first-in first-out buffer (FIFO). In step 7, the FIFO buffer continuously writes to a screen refresh memory and updates the video display with new slice information.

Figure 3A:
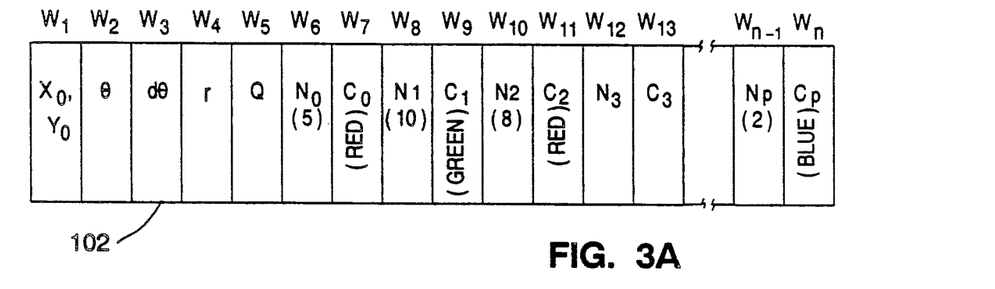
FIG. 3a is a block diagram illustrating radar data as stored in memory registers prior to processing in accordance with the present invention.
Figure 3B:
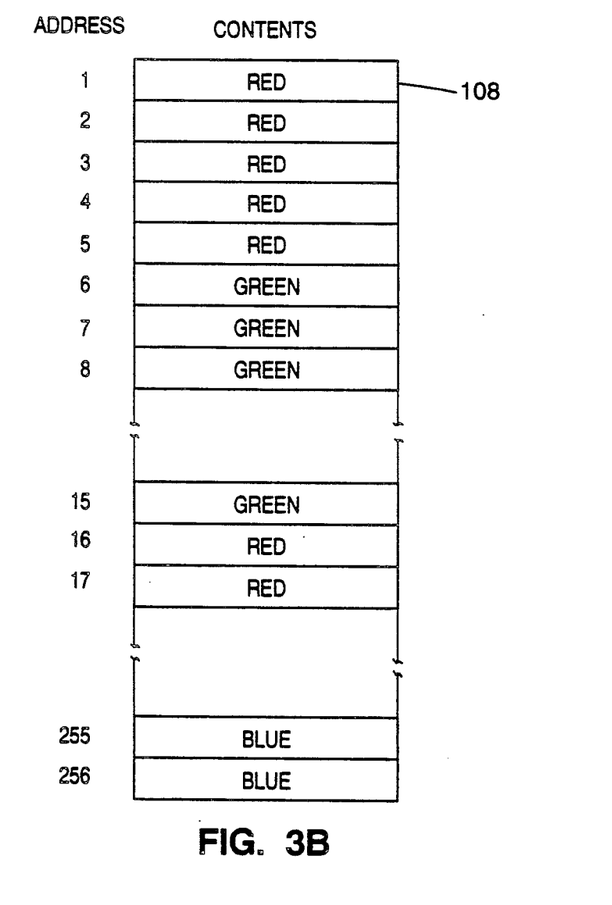
FIG. 3b is a block diagram illustrating the content of a set of memory registers after expansion of radar data in accordance with the present invention.
Figure 3C:
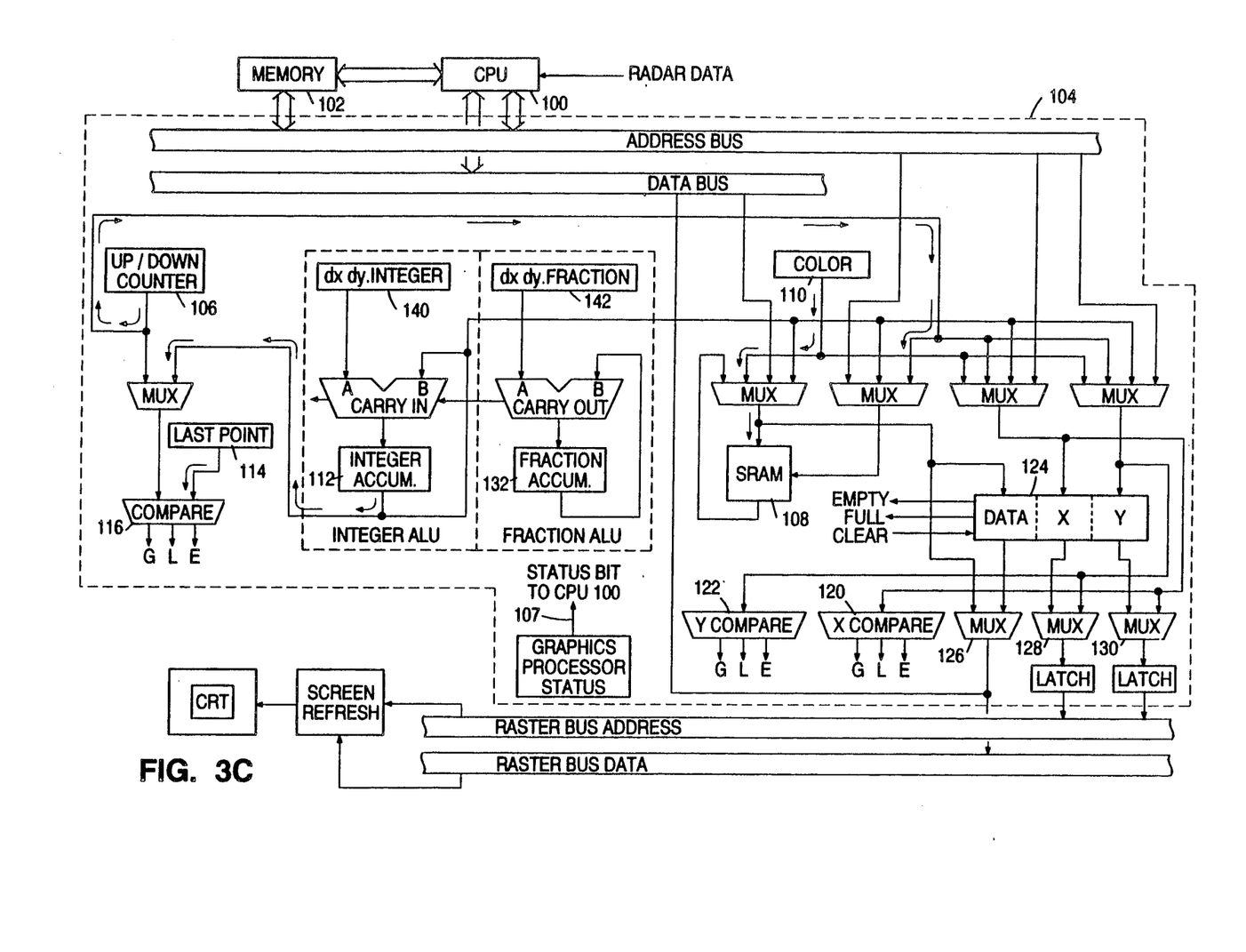
FIG. 3c is a block diagram of the present invention operating as a graphics accelerator in which the data path to achieve data expansion is shown.

Referring to FIGS. 3a-c, a group of radar data is received by a data processing system (CPU) 100, encoded, and stored in a memory 102. In order to reduce the complexity of FIG. 3c, the control and data paths between the various registers, multiplexers, and comparators of the graphics accelerator 104 and that of the CPU 100 are not shown, the appropriate interconnections being well known to one of ordinary skill in the art. Each data group is stored as a set of 16-bit words $W_1, W_2 \ldots W_n$, wherein each group contains a center point $x_0, y_0$, a radius r, a delta angle $\partial\&4$, a starting angle $\theta$, a quantity Q, and a plurality of pairs of radial data N,C, where Q is the number of pairs N,C included in each data group, and where N equals the number of radial displacement units which have a color C. The pairs do not have x-y coordinates, rather the sum of all N's defines the radius r.

A graphics accelerator 104 performs an expansion of the radial data pairs. The result is a table 108 in which each displacement unit along the radius has a color assigned to it. Before expansion, the table is initialized to contain the value black in every address location, and the expansion process overwrites referenced locations. For example, if $N_0=5$ and $C_0=$red, then five successive radial displacement units are red, and the pair $N_0,C_0$ is expanded by writing the value red into five successive address locations in table 108. Likewise if $N_1=10$ and $C_1=$green, the pair $N_1,C_1$ is expanded by writing the value green into ten successive address locations in table 108, and so on until all data pairs have been expanded into the table.

To accomplish the expansion, the CPU waits for the graphics accelerator status bit 107 to indicate that the graphics accelerator is not busy. Then the CPU sets the graphics accelerator's configuration register (not shown) to select an appropriate data path as shown by the arrows in FIG. 3c and enable a write operation to the static random access memory (SRAM) 108. A stop condition is set in the stop comparator 116 as equal to or greater than. The up/down counter 106 is set to zero. The color value C is then loaded into the color register 110. The integer accumulator register 112 is set to zero. The last point register 114 is loaded with the value N. The up/down counter 106 generates sequential addresses in the SRAM 108 where the value in the color register will be stored. The value in the color register 110 is then copied into the SRAM 108 at the location corresponding to the address provided by the output of the up/down counter 106. The integer accumulator 112 increments by one. The same color value C is copied from the color register 110 to successive locations in the SRAM 108 as addressed by the up/down counter output until the value in the integer accumulator 112 equals the value in the last point register 114. When the condition is met, the expansion loop begins again with the next data pair, continuing until all data pairs have been expanded, thus yielding a color table in which each radial displacement unit is associated with a specific color.

Figure 4:
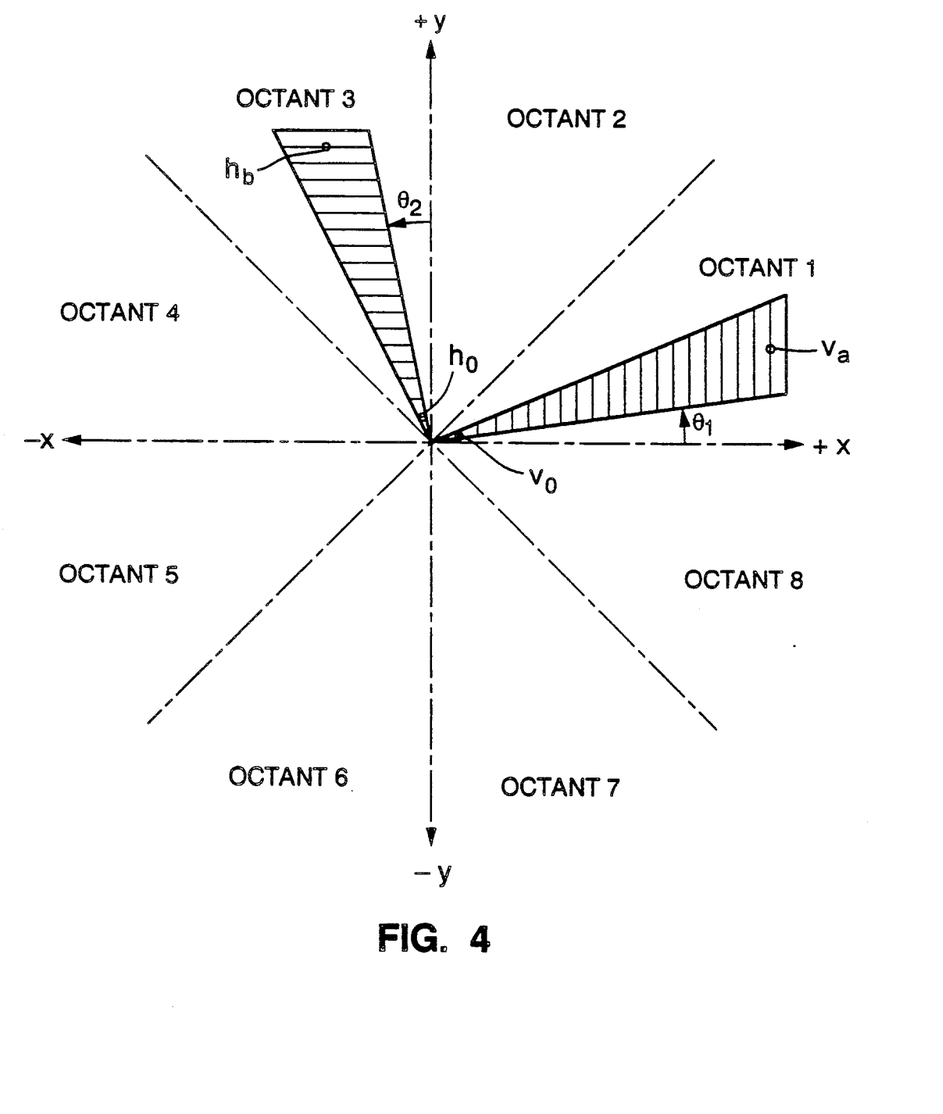
FIG. 4 is an illustration of radar slices displayed in octants 1 and 3 of a Cartesian coordinate-based display which has been divided into octants.

Referring now to FIG. 4, the method for filling in a slice 40 depends on where in the x-y plane the slice is to drawn, and this is determined from the starting angle $\theta$. The x-y plane is divided into octants, each octant comprising a 45° region, where 0° is said to coincide with the positive x axis and degrees are measured counterclockwise about the intersection of the x and y axes.

Thus, octant 1 comprises the region $0° < \theta \leq 45°$; octant 2 comprises the region $45° < \theta \leq 90°$; octant 3 comprises the region $90° < \theta \leq 135°$; octant 4 comprises the region $135° < \theta \leq 180°$; octant 5 comprises the region $180° < \theta \leq 225°$; octant 6 comprises the region $225° < \theta \leq 270°$; octant 7 comprises the region $270° < \theta \leq 315°$; and octant 8 comprises the region $315° < \theta \leq 360°$. For slices of data residing in octants 1, 4, 5, or 8, these slices are filled by drawing vertical vectors such as $v_0 - v_a$. For slices of data residing in octants 2, 3, 6, or 7, these slices are filled by drawing horizontal vectors such as $h_0 - h_b$.

Once the octant in which the slice is to be drawn is determined, the values of sin $\theta$, cos $\theta$, tan $\theta$, and sec $\theta$ are determined by use of a trigonometric lookup table (not shown). This lookup table may be stored in read-only memory (ROM). A set of constants are then calculated for that octant for use in a vector drawing procedure as follows:

for $0° < \theta \leq 45°$:
  $\theta = \theta$;
  dy = tan $\theta$;
  dn = cos $\theta$;
  bn = tan $(\theta + d\theta) -$ tan $\theta$;
  dr = sin $\theta$;
  dR = sec $\theta$;
for $45° < \theta \leq 90°$:
  $\theta = 90° - \theta$;
  dy = tan $\theta$;
  dn = cos $\theta$;
  bn = tan $(\theta + d\theta) -$ tan $\theta$;
  dr = sin $\theta$;
  dR = sec $\theta$;
for $90° < \theta \leq 135°$:
  $\theta = \theta - 90°$;
  dy = $-$tan $\theta$;
  dn = cos $\theta$;
  bn = tan $(\theta + d\theta) -$ tan $\theta$;
  dr = $-$sin $\theta$;
  dR = sec $\theta$;
for $135° < \theta \leq 180°$:
  $\theta = 180° - \theta$;
  dy = tan $\theta$;
  dn = cos $\theta$;
  bn = tan $(\theta + d\theta) -$ tan $\theta$;
  dr = sin $\theta$;
  dR = sec $\theta$;
for $180° < \theta \leq 225°$:
  $\theta = \theta - 180°$;
  dy = $-$tan $\theta$;
  dn = cos $\theta$;
  bn = tan $(\theta + d\theta) -$ tan $\theta$;
  dr = $-$sin $\theta$;
  dR = sec $\theta$;
for $225° < \theta \leq 270°$:
  $\theta = 270° - \theta$;
  dy = $-$tan $\theta$;
  dn = cos $\theta$;
  bn = tan $(\theta + d\theta) -$ tan $\theta$;
  dr = $-$sin $\theta$;
  dR = sec $\theta$;
for $270° < \theta \leq 315°$:
  $\theta = \theta - 270°$;
  dy = tan $\theta$;
  dn = cos $\theta$;
  bn = tan $(\theta + d\theta) -$ tan $\theta$;
  dr = sin $\theta$;
  dR = sec $\theta$;

for $315° < \theta \leq 360°$:
$\theta = 360° - \theta$;
$dy = -\tan \theta$;
$dn = \cos \theta$;
$bn = \tan (\theta + d\theta) - \tan \theta$;
$dr = -\sin \theta$;
$dR = \sec \theta$.

Figure 5:
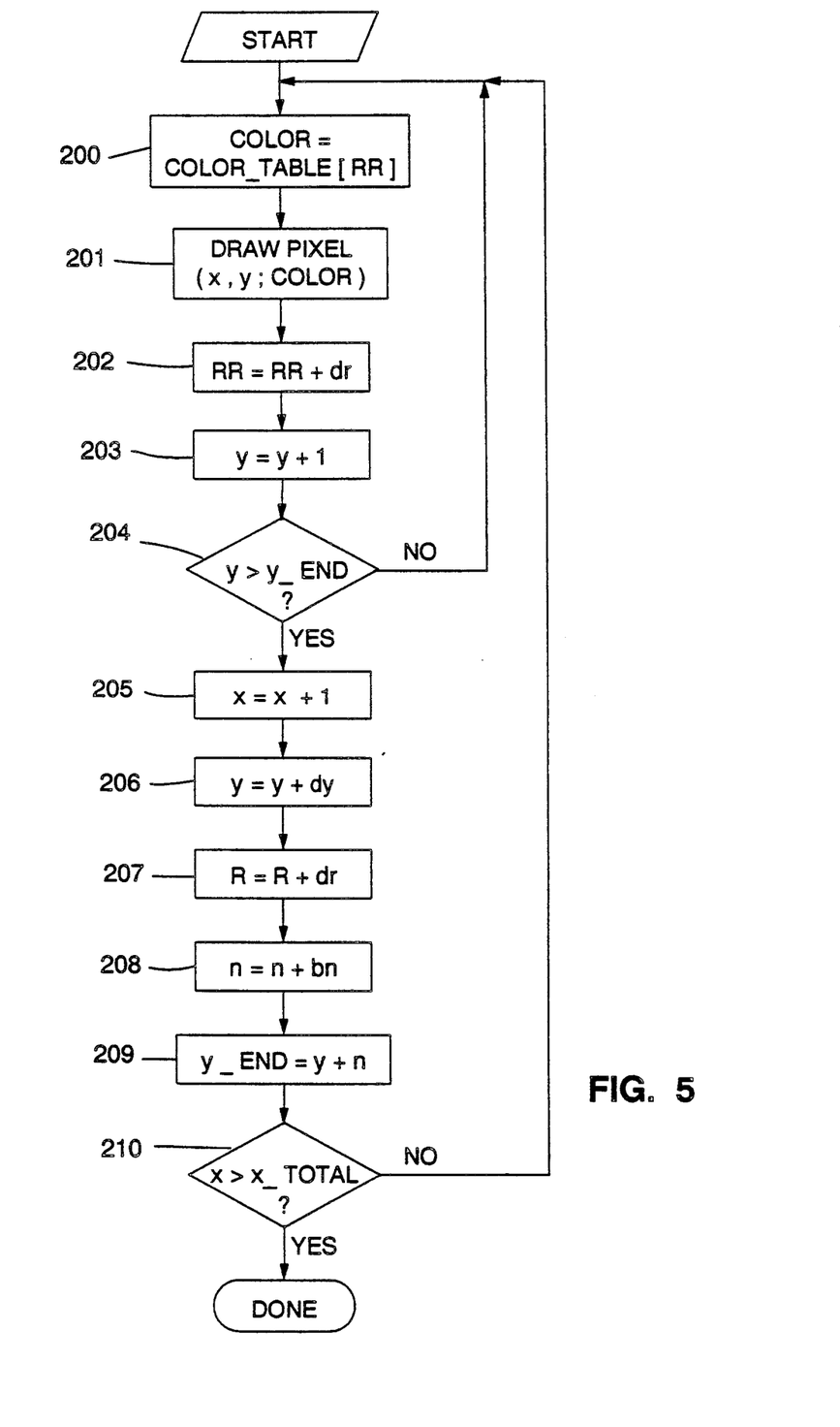
FIG. 5 is a flow chart showing the steps for drawing vertical vectors in accordance with the present invention.

A flow diagram showing the procedure for drawing a vertical vector in accordance with the present invention is illustrated in FIG. 5. In step 200, a color is retrieved from the color table based on first index RR, where RR = R, R being initially set at zero. RR is the location in the color table 108 from which the color of the pixel to be displayed is retrieved. In step 201, a pixel is drawn at point x,y having the color just retrieved in step 200. Point x,y is initially set equal to $x_0,y_0$. In step 202, the color table first index RR is updated to specify the color of the next pixel by adding to it the calculated constant dr. The constant dr is less than one. In step 203, the y coordinate is incremented by one to move to the next vertical pixel in which the vector will be drawn. In step 204, the incremented y coordinate is compared to the calculated end value $y_{end}$ for the x coordinate of the vertical vector being drawn, where $y_{end} 32 y + n$, where n is the number of pixels required to fill the vertical slice. If the end value $y_{end}$ has not been reached, steps 200 through 204 are repeated until the condition is satisfied.

In step 205, the x coordinate is incremented by one. In step 206, the y coordinate is incremented by the calculated constant dy to move to the next vertical vector to be drawn. In step 207, a second color table index R is updated by adding to it the calculated constant dR. The constant dR is greater than one. In step 208, the number of pixels n required to fill the slice at the new x coordinate is updated by adding the calculated constant bn to n. In step 209, the end value $y_{end}$ is recalculated by adding the new value of n to y to reflect the difference in width of the slice at the new x coordinate.

In step 210, x is compared to the number of pixels $x_{total}$ which are required in the x direction in order to fill the slice, $x_{total}$ being a constant equal to the radius r multiplied by the calculated constant dn, an x projection. If the total number of x direction pixels $x_{total}$ have not been drawn, then steps 200 through 210 are repeated until all pixels have been drawn.

Figure 6:
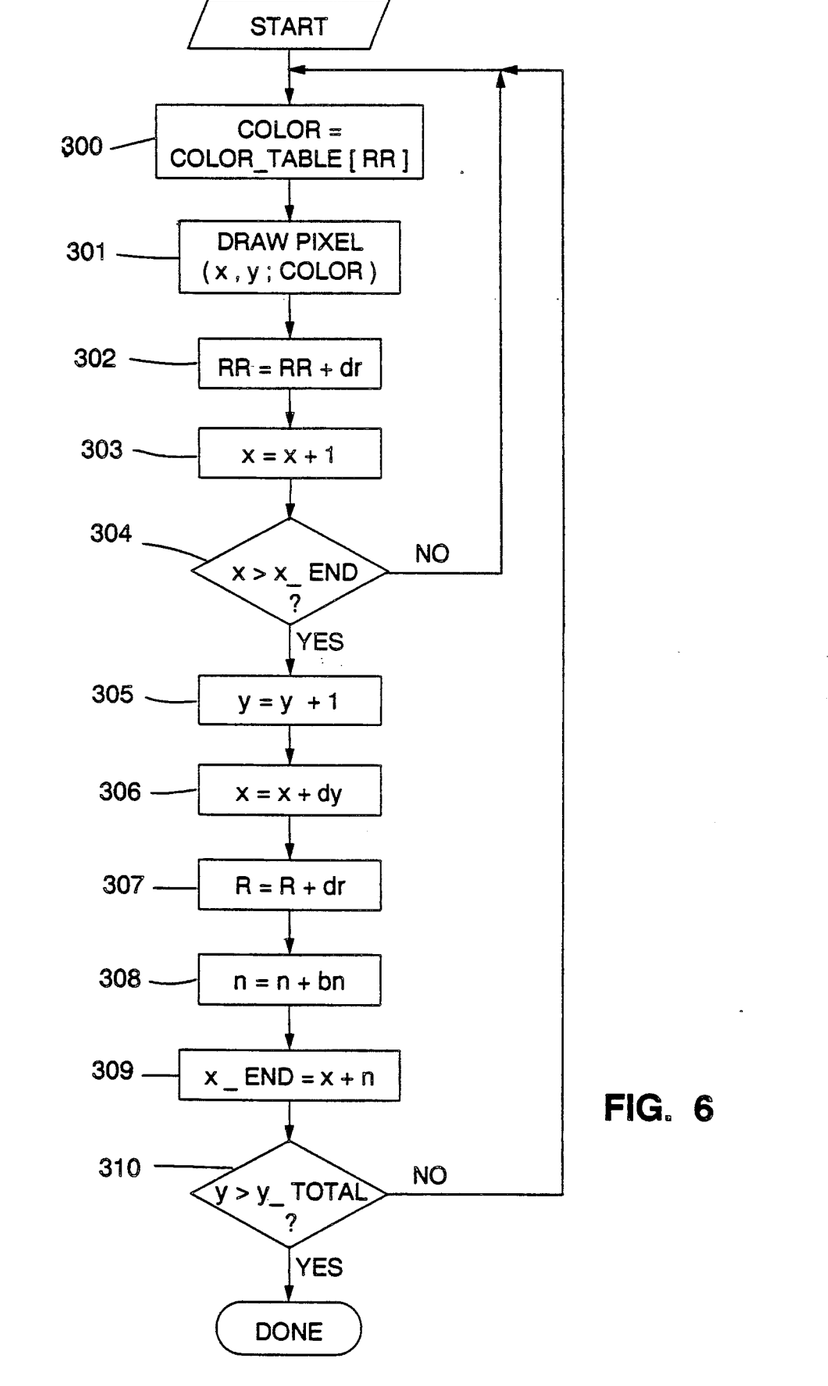
FIG. 6 is a flow chart showing the steps for drawing horizontal vectors in accordance with the present invention.

A flow diagram showing the procedure for drawing a horizontal vector in accordance with the present invention is illustrated in FIG. 6. In step 300, a color is retrieved from the color table based on first index RR, where RR = R, R being initially set at zero. RR is the location in the color table from which the color of the pixel to be displayed is retrieved. In step 301, a pixel is drawn at point x,y having the color just retrieved in step 300. Point x,y is initially set equal to $x_0,y_0$. In step 302, the color table index RR is updated to specify the color of the next pixel by adding to it the calculated constant dr. The constant dr is less than one. In step 303, the x coordinate is incremented by one to move to the next horizontal pixel in which the vector will be drawn. In step 304, the incremented x coordinate is compared to the calculated end value $x_{end}$ for the y coordinate of the horizontal vector being drawn, where $x_{end} = x + n$, where n is the number of pixels required to fill the horizontal slice. If the end value $x_{end}$ has not been reached, steps 300 through 304 are repeated until the condition is satisfied.

In step 305, the y coordinate is incremented by one. In step 306, the x coordinate is incremented by the calculated constant dy to move to the next horizontal vector to be drawn. In step 307, a second color table index R is updated by the calculated constant dR. The constant dR is greater than one. In step 308, the number of pixels n required to fill the slice at the new y coordinate is updated by adding the constant bn to n. In step 309, the end value $x_{end}$ is recalculated by adding the new value of the number of pixels n to x to reflect the difference in height of the slice at this new y coordinate.

In step 310, y is compared to the number of pixels $y_{total}$ which are required in the y direction in order to fill the slice, $y_{total}$ being a constant equal to the radius r multiplied by the calculated constant dn, a y projection. If the total number of y direction pixels $y_{total}$ have not been drawn, then steps 300 through 310 are repeated until all pixels have been drawn.

Figure 7:
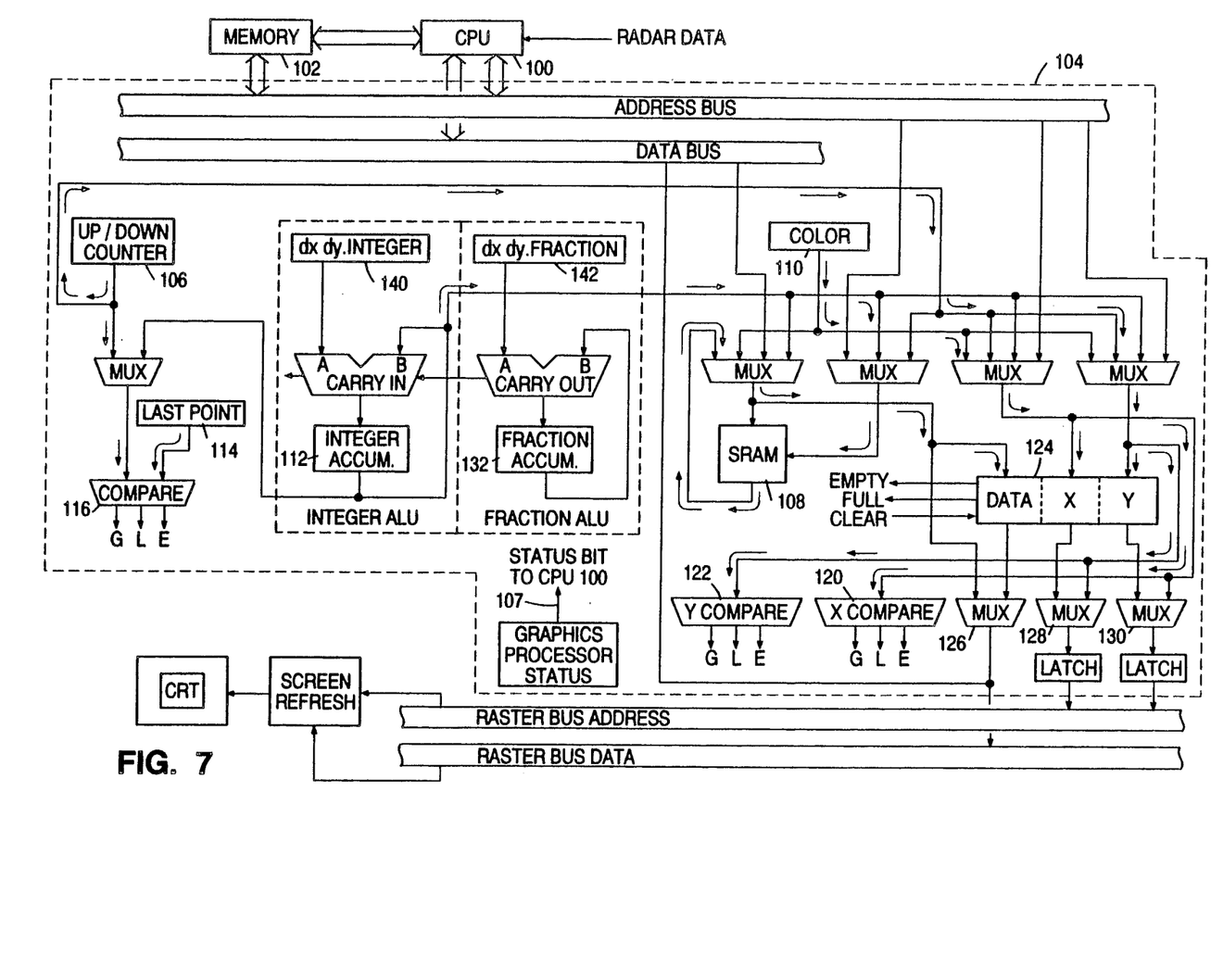
FIG. 7 is a block diagram of the present invention operating as a graphics accelerator in which the data path to achieve radar slice drawing is shown.

The hardware implementation of the drawing procedure is illustrated in FIG. 7 and will be discussed for a vertical vector. In order to reduce the complexity of FIG. 7, the control and data paths between the various registers, multiplexers, and comparators of the graphics accelerator 104 and that of the CPU 100 are not shown, the appropriate interconnections being well known to one of ordinary skill in the art. For each fill line, the CPU waits for the graphics accelerator status bit 107 to indicate that the graphics accelerator 104 is not busy. The CPU then sets the graphics accelerator's configuration register (not shown) to select an appropriate data path and set the appropriate bit values in comparators 120 and 122, SRAM address and data 108, FIFO register 124, and FIFO output multiplexers 126, 128, and 130. The stop comparator 116 is set to the condition equal to or greater than. The x coordinate of the fill line is then loaded into the color register 110. The starting y coordinate is loaded into the up/down counter 106. The end value of y is loaded into the last point register 114. The first color table index RR is loaded into both the integer accumulator 112 and the fraction accumulator 132. The integer accumulator 112 and fraction accumulator 132 are used to calculate the index RR of the color table. The integer portion of the index is used as an address to access the color table stored in SRAM 108. The increment of the index is stored in registers 140 and 142. The results are then written to the FIFO buffer 124, where the raster will update the pixel information displayed on the CRT on its next scan.

The terms and expressions which have been employed here are used as terms of description and not of limitation, and there is no intention in the use of such terms and expressions to exclude equivalents of the features shown and described, or portions thereof, it being recognized that various modifications are possible within the scope of the invention as claimed.

We claim:

1. A method for displaying radar data on a video display monitor, wherein said display is divided into octants, and wherein said radar data defines a pie-shaped slice to be displayed within an octant on said video display monitor, said radar data having a center point which is defined as a point on an x-y plane, a radius r which is a predetermined number of displacement units in length extending from the center point, a starting angle $\theta$, a delta angle $\partial\theta$, radial displacement data which defines the color of groups of displacement units along the radius r for the slice, and a quantity Q which is the number of groups of radial displacement data within said radar data, and further wherein said radar data is received by a data processing system and stored in memory, wherein the video display monitor is updated by a screen refresh memory, the method comprising the steps of:

(a) determining the octant in which the slice is to be displayed and calculating a set of constants from the radar data;

(b) loading the radial displacement data into a graphics accelerator;

(c) expanding the radial displacement data into a color table which correlates the radial displacement data to pixel colors so that each displacement unit along the radius r has a color assigned to it;

(d) loading the set of constants into the graphics accelerator;

(e) generating vertical or horizontal fill vectors for filling in the slice as determined by the octant in which the slice is to be displayed, said vectors having pixel colors as determined by the color table; and   (e) inhibiting the loading steps while the expanding or generating steps are being performed.

2. The method according to claim 1, wherein the radial displacement data comprises a plurality of pairs of length and run data in which each length datum designates a color in binary coded form, and the run datum represents a number of consecutive displacement units which have the designated color, and further wherein said expanding step includes the steps of   storing the color table in a random access memory;

assigning a location in the random access memory to each displacement unit which forms the radius r; and   transferring the designated color associated with each displacement unit into the location assigned to the displacement unit.

3. The method according to claim 2 wherein the graphics accelerator provides a not busy signal when it is not processing the expanding or generating steps, and further wherein the generating step includes the step of   holding the horizontal or vertical vectors to be used to fill the slice in a first-in-first out memory, said screen refresh memory being continuously updated by the first-in-first-out memory.

4. The method according to claim 3, wherein said octants each cover a range of angles referenced to a common starting point and consecutively apportioned about the x-y axes, and further wherein the determining step includes the step of identifying the octant having the range of angles in which the starting angle of the slice to be displayed falls.

5. The method according to claim 4, wherein the generating step includes the steps of   preparing data for vertical vectors to fill the slice when the slice is located in an octant which abuts the x-axis; and   preparing data for horizontal vectors to fill the slice when the slice is located in an octant which abuts the y-axis.

6. The method according to claim 5, wherein the step of preparing vertical vectors to fill the slice comprises the steps of:

(i) calculating a set of constants from the radar data, including a y increment, dy, where $dy = +/- \tan \eta$ depending upon the octant in which the slice is located;

an x projection, dn, where $dn = \cos \eta$;

a first color table increment, dr, where $dr = +/- \sin \eta$ depending upon the octant in which the slice is located;

a second color table increment, dR, where $dR = \sec \eta$;

a pixel quantity increment, bn, where $bn = \tan(\eta + \partial\theta) - \tan \eta$;

a pixel quantity, n, where $n = n + bn$;

a y end point, $y_{end}$, where $y_{end} = y + n$;

an x barrier, $x_{total}$, where $x_{total} = r \times dn$; and     where $\eta$ is a function of $\theta$ and the octant in which the slice to be filled is located;

(ii) retrieving a color from the color table location which is addressed by a first color table index, RR, where $RR = R$ and $R = R + dR$, and where R is initially set to zero;

(iii) designating a pixel to be drawn at location x,y having the color retrieved in step (ii), where x,y is initially the center point of the radar data;

(iv) incrementing the y coordinate such that $y = y + 1$;

(v) incrementing the first color table index RR such that $RR = RR + dr$;

(vi) repeating steps (ii) through (v) until $y > y_{end}$, so that pixels are designated which form a vertical vector;

(vii) incrementing the x coordinate such that $x = x + 1$;

(viii) incrementing the y coordinate such that $y = y + dy$;

(ix) incrementing a second color table index R such that $R = R + dR$;

(x) incrementing the pixel quantity n such that $n = n + bn$;

(xi) incrementing the y end point such that $y_{end} = y + n$;

(xii) repeating steps (ii) through (xi) until $x > x_{total}$.

7. The method according to claim 5, wherein the step of preparing horizontal vectors to fill the slice comprises the steps of:

(i) calculating a set of constants from the radar data, including an x increment, dy, where $dy = +/- \tan \eta$ depending upon the octant in which the slice is located;

a y projection, dn, where $dn = \cos \eta$;

a first color table increment, dr, where $dr = +/- \sin \eta$ depending upon the octant in which the slice is located;

a second color table increment, dR, where $dR = \sec \eta$;

a pixel quantity increment, bn, where $bn = \tan(\eta + \partial\theta) - \tan \theta$;

a pixel quantity, n, where $n = n + bn$;

an x end point, $x_{end}$, where $x_{end} = x + n$;

an y barrier, $y_{total}$, where $y_{total} = r \times dn$; and     where $\eta$ is a function of $\theta$ and the octant in which the slice is to be displayed;

(ii) retrieving a color from the color table location which is addressed by a first color table index, RR, where $RR = R$ and $R = R + dR$, and where R is initially set to zero;

(iii) designating a pixel to be drawn at location x,y having the color retrieved in step (ii), where x,y is initially the center point of the radar   (iv) incrementing the x coordinate such that $x = x + 1$;

(v) incrementing the first color table index RR such that $RR = RR + dr$;

(vi) repeating steps (ii) through (v) until $x > x_{end}$, so that pixels are designated which form a horizontal vector;

(vii) incrementing the y coordinate such that $y = y+1$;

(viii) incrementing the x coordinate such that $x = x + dy$;

(ix) incrementing a second color table index R such that $R = R + dR$;

(x) incrementing the pixel quantity n such that $n = n + bn$;

(xi) incrementing the x end point such that $x_{end} = x + n$;

(xii) repeating steps (ii) through (xi) until $y > y_{total}$.

8. The method according to claims 6 or 7, wherein said octants comprise first through eighth octants, the first octant covering the range from 0° to and including 45°, the second octant covering the range from 45° to and including 90°, the third octant covering the range from 90° to and including 135°, the fourth octant covering the range from 135° to and including 180°, the fifth octant covering the range from 180° to and including 225°, the sixth octant covering the range from 225° to and including 270°, the seventh octant covering the range from 270° to and including 315°, and the eighth octant covering the range from 315° to and including 360°, and further wherein the calculating steps said constants are calculated as a function of the octant in which the slice is to be drawn in, as follows:

for $0° < \theta \leq 45°$:
$\eta = \theta$;
$dy = +\tan \eta$;
$dr = +\sin \eta$;

for $45° < \theta \leq 90°$:
$\eta = 90° - \theta$;
$dy = +\tan \eta$;
$dr = +\sin \eta$;

for $90° < \theta \leq 135°$:
$\eta = \theta - 90°$;
$dy = -\tan \eta$;
$dr = -\sin \eta$;

for $135° < \theta \leq 180°$:
$\eta = 180° - \theta$;
$dy = +\tan \eta$;
$dr = +\sin \eta$;

for $180° < \theta \leq 225°$:
$\eta = \theta - 180°$;
$dy = -\tan \eta$;
$dr = -\sin \eta$;

for $225° < \theta \leq 270°$:
$\eta = \theta - 270°$;
$dy = -\tan \eta$;
$dr = -\sin \eta$;

for $270° < \theta \leq 315°$:
$\eta = \theta - 270°$;
$dy = +\tan \eta$;
$dr = +\sin \eta$;

for $315° < \theta \leq 360°$:
$\eta = 360° - \theta$;
$dy = -\tan \eta$;
$dr = -\sin \eta$.

9. An apparatus for displaying radar data on a video display monitor, wherein said display is divided into octants, and wherein said radar data defines a pie-shaped slice to be displayed within an octant on said video display monitor, said radar data having a center point which is defined as a point on an x-y plane, a radius r which is a predetermined number of displacement units in length extending from the center point, a starting angle $\theta$, a delta angle $\partial\theta$, radial displacement data which defines the color of groups of displacement units along the radius r for the slice, and a quantity Q which is the number of groups of radial displacement data within said radar data, and further wherein said radar data is received by a data processing system and stored in memory, wherein the video display monitor is updated by a screen refresh memory, the apparatus comprising:

(a) means for determining the octant in which the slice is to be displayed and calculating a set of constants from the radar data;

(b) first means for loading the radial displacement data into a graphics accelerator;

(c) means for expanding the radial displacement data into a color table which correlates the radial displacement data to pixel colors so that each displacement unit along the radius r has a color assigned to it;

(d) second means for loading the set of constants into the graphics accelerator;

(e) means for generating vertical or horizontal fill vectors for filling in the slice as determined by the octant in which the slice is to be displayed, said vectors having pixel colors as determined by the color table; and (f) means for inhibiting the first and second loading means while the expanding or generating means are operating.

10. The apparatus according to claim 9, wherein the radial displacement data comprises a plurality of pairs of length and run data in which each length datum designates a color in binary coded form, and the run datum represents a number of consecutive displacement units which have the designated color, and further wherein said expanding means includes:

random access memory means for storing the color table;

means for assigning a location in the random access memory means to each displacement unit which forms the radius r; and means for transferring the designated color associated with each displacement unit into the location assigned to the displacement unit.

11. The apparatus in accordance with claim 10 wherein the graphics accelerator provides a not busy signal when the means for expanding and means for generating are inactive, and further wherein the means for generating includes:

first-in-first out memory means for holding the horizontal or vertical vectors to be used to fill the slice, said screen refresh memory being continuously updated by the first-in-first-out memory.

12. The apparatus according to claim 11, wherein said octants each cover a range of angles referenced to a common starting point and consecutively apportioned about the x-y axes, and further wherein the means for determining identifies the octant having the range of angles in which the starting angle of the slice to be displayed falls.

13. The apparatus according to claim 12, wherein the means for generating prepares data for vertical vectors to fill the slice when the slice is located in an octant which abuts the x-axis, and prepares data for horizontal vectors to fill the slice when the slice is located in an octant which abuts the y-axis.

14. The apparatus according to claim 13, wherein the means for generating prepares vertical vectors to fill the slice by the steps of:
 (i) calculating a set of constants from the radar data, including
  a y increment, dy, where $dy = +/- \tan \eta$ depending upon the octant in which the slice is located;
  an x projection, dn, where $dn = \cos \eta$;
  a first color table increment, dr, where $dr = +/- \sin \eta$ depending upon the octant in which the slice is located;
  a second color table increment, dR, where $dR = \sec \eta$;
  a pixel quantity increment, bn, where $bn = \tan(\eta + \partial\theta) - \tan \eta$;
  a pixel quantity, n, where $n = n + bn$;
  a y end point, $y_{end}$, where $y_{end} = y + n$;
  an x barrier, $x_{total}$, where $x_{total} = r \times dn$; and
  where $\eta$ is a function of $\theta$ and the octant in which the slice to be filled is located;
 (ii) retrieving a color from the color table location which is addressed by a first color table index, RR, where $RR = R$ and $R = R + dR$, and where R is initially set to zero;
 (iii) designating a pixel to be drawn at location x,y having the color retrieved in step (ii), where x,y is initially the center point of the radar data;
 (iv) incrementing the y coordinate such that $y = y + 1$;
 (v) incrementing the first color table index RR such that $RR = RR + dr$;
 (vi) repeating steps (ii) through (v) until $y > y_{end}$, so that pixels are designated which form a vertical vector;
 (vii) incrementing the x coordinate such that $x = x + 1$;
 (viii) incrementing the y coordinate such that $y = y + dy$;
 (ix) incrementing a second color table index R such that $R = R + dR$;
 (x) incrementing the pixel quantity n such that $n = n + bn$;
 (xi) incrementing the y end point such that $y_{end} = y + n$;
 (xii) repeating steps (ii) through (xi) until $x > x_{total}$.

15. The apparatus according to claim 13, wherein the means for generating means prepares horizontal vectors to fill the slice by the steps of:
 (i) calculating a set of constants from the data, including
  an x increment, dy, where $dy = +/- \tan \eta$ depending upon the octant in which the slice is located;
  a y projection, dn, where $dn = \cos \eta$;
  a first color table increment, dr, where $dr = +/- \sin \eta$ depending upon the octant in which the slice is located;
  a second color table increment, dR, where $dR = \sec \eta$;
  a pixel quantity increment, bn, where $bn = \tan(\eta + \partial\theta) - \tan \theta$;
  a pixel quantity, n, where $n = n + bn$;
  an x end point, $x_{end}$, where $x_{end} = x + n$;
  an y barrier, $y_{total}$, where $y_{total} = r \times dn$; and
  where $\eta$ is a function of $\theta$ and the octant in which the slice is to be displayed;
 (ii) retrieving a color from the color table location which is addressed by a first color table index, RR, where $RR = R$ and $R = R + dR$, and where R is initially set to zero;
 (iii) designating a pixel to be drawn at location x,y having the color retrieved in step (ii), where x,y is initially the center point of the radar data;
 (iv) incrementing the x coordinate such that $x = x + 1$;
 (v) incrementing the first color table index RR such that $RR = RR + dr$;
 (vi) repeating steps (ii) through (v) until $x > x_{end}$, so that pixels are designated which form a horizontal vector;
 (vii) incrementing the y coordinate such that $y = y + 1$;
 (viii) incrementing the x coordinate such that $x = x + dy$;
 (ix) incrementing a second color table index R such that $R = R + dR$;
 (x) incrementing the pixel quantity n such that $n = n + bn$;
 (xi) incrementing the x end point such that $x_{end} = x + n$;
 (xii) repeating steps (ii) through (xi) until $y > y_{total}$.

16. The apparatus according to claims 14 or 15, wherein said octants comprise first through eighth octants, the first octant covering the range from 0° to and including 45°, the second octant covering the range from 45° to and including 90°, the third octant covering the range from 90° to and including 135°, the fourth octant covering the range from 135° to and including 180°, the fifth octant covering the range from 180° to and including 225°, the sixth octant covering the range from 225° to and including 270°, the seventh octant covering the range from 270° to and including 315°, and the eighth octant covering the range from 315° to and including 360°, and further wherein the calculating steps said constants are calculated by the generating means according to which octant the slice is to be drawn in, as follows:

for $0° < \theta \leq 45°$:
 $\eta = \theta$;
 $dy = +\tan \eta$;
 $dr = +\sin \eta$;
for $45° < \theta \leq 90°$:
 $\eta = 90° - \theta$;
 $dy = +\tan \eta$;
 $dr = +\sin \eta$;
for $90° < \theta \leq 135°$:
 $\eta = \theta - 90°$;
 $dy = -\tan \eta$;
 $dr = -\sin \eta$;
for $135° < \theta \leq 180°$:
 $\eta = 180° - \theta$;
 $dy = +\tan \eta$;
 $dr = +\sin \eta$;
for $180° < \theta \leq 225°$:
 $\eta = \theta - 180°$;
 $dy = -\tan \eta$;
 $dr = -\sin \eta$;
for $225° < \theta \leq 270°$:
 $\eta = 270° - \theta$;
 $dy = -\tan \eta$;
 $dr = -\sin \eta$;
for $270° < \theta \leq 315°$:
 $\eta = \theta - 270°$;
 $dy = +\tan \eta$;
 $dr = +\sin \eta$;
for $315° < \theta \leq 360°$:
 $\eta = 360° - \theta$;
 $dy = -\tan \eta$;
 $dr = -\sin \eta$.

* * * * *